(12) United States Patent
Revell

(10) Patent No.: US 10,079,814 B2
(45) Date of Patent: Sep. 18, 2018

(54) SECURE NODE-TO-MULTINODE COMMUNICATION

(71) Applicant: KELISEC AB, Bromma (SE)

(72) Inventor: Elise Revell, Rånäs (SE)

(73) Assignee: KELISEC AB, Bromma (SE)

( * ) Notice: Subject to any disclaimer, the term of this patent is extended or adjusted under 35 U.S.C. 154(b) by 0 days.

(21) Appl. No.: 15/513,433

(22) PCT Filed: Sep. 4, 2015

(86) PCT No.: PCT/SE2015/050940
§ 371 (c)(1),
(2) Date: Mar. 22, 2017

(87) PCT Pub. No.: WO2016/048217
PCT Pub. Date: Mar. 31, 2016

(65) Prior Publication Data
US 2018/0054427 A1    Feb. 22, 2018

(30) Foreign Application Priority Data
Sep. 23, 2014    (SE) ...................... 1451121

(51) Int. Cl.
*H04L 9/32* (2006.01)
*H04L 29/06* (2006.01)
*H04L 9/08* (2006.01)

(52) U.S. Cl.
CPC .......... *H04L 63/065* (2013.01); *H04L 9/0844* (2013.01); *H04L 63/0428* (2013.01);
(Continued)

(58) Field of Classification Search
CPC .. H04L 63/065; H04L 9/0844; H04L 63/0428
(Continued)

(56) References Cited

U.S. PATENT DOCUMENTS

| 4,578,531 A | 3/1986 | Everhart et al. |
|---|---|---|
| 6,125,186 A | 9/2000 | Saito et al. |

(Continued)

FOREIGN PATENT DOCUMENTS

| EP | 1443795 A1 | 8/2004 |
|---|---|---|
| EP | 2663051 A1 | 11/2013 |

(Continued)

OTHER PUBLICATIONS

Int'l Search Report and Written Opinion issued in connection with Int'l Appl'n No. PCT/SE2015/050940 dated Sep. 4, 2015.

(Continued)

*Primary Examiner* — Anthony Brown
(74) *Attorney, Agent, or Firm* — Merchant & Gould P.C.

(57) ABSTRACT

The present disclosure relates to communication sessions between a first node and a plurality of other nodes. Two cryptographic keys are generated. A first cryptographic key is generated (113A) in a first node (10), e.g. Node A. A second cryptographic key is generated (113B) by a second node (22), which is a virtual and temporary node which is executed on a server (20). The second cryptographic key is transmitted to several other nodes (30). The first and second cryptographic keys, which are the same, may then be applied in communication sessions between the first node (10) and the several other nodes (30). Hereby it is made possible to allow for node-to-multinode communication sessions that offer the same, or substantially the same, security as conventional node-to-node communication sessions.

11 Claims, 12 Drawing Sheets

(52) U.S. Cl.
CPC ...... *H04L 65/1069* (2013.01); *H04L 63/0884* (2013.01); *H04L 2209/76* (2013.01)

(58) Field of Classification Search
USPC .......................................................... 713/163
See application file for complete search history.

(56) References Cited

U.S. PATENT DOCUMENTS

| | | | |
|---|---|---|---|
| 7,043,633 | B1 | 5/2006 | Fink et al. |
| 7,149,308 | B1 | 12/2006 | Fruehauf et al. |
| 7,424,115 | B2 | 9/2008 | Hyyppa et al. |
| 7,587,368 | B2 | 9/2009 | Felsher |
| 7,805,377 | B2 | 9/2010 | Felsher |
| 7,979,707 | B2 | 7/2011 | Rostin et al. |
| 8,433,066 | B2 | 4/2013 | Revell |
| 8,498,941 | B2 | 7/2013 | Felsher |
| 2002/0159598 | A1 | 10/2002 | Rubinstein et al. |
| 2006/0285694 | A1 | 12/2006 | Kim et al. |
| 2007/0201702 | A1 | 8/2007 | Hendricks et al. |
| 2008/0147820 | A1* | 6/2008 | Maeda ............... H04L 9/0858 709/213 |
| 2008/0235513 | A1 | 9/2008 | Foster et al. |
| 2009/0177894 | A1 | 7/2009 | Orsini et al. |
| 2009/0296924 | A1 | 12/2009 | Oksman et al. |
| 2010/0161817 | A1 | 6/2010 | Xiao et al. |
| 2010/0254533 | A1 | 10/2010 | McCullough et al. |
| 2010/0312810 | A1 | 12/2010 | Horton et al. |
| 2010/0318802 | A1 | 12/2010 | Balakrishnan |
| 2011/0246770 | A1 | 10/2011 | Badra et al. |
| 2011/0264913 | A1 | 10/2011 | Nikander et al. |
| 2012/0072723 | A1 | 3/2012 | Orsini et al. |
| 2012/0087495 | A1 | 4/2012 | Revell |
| 2012/0200386 | A1 | 8/2012 | Robshaw et al. |
| 2012/0265976 | A1 | 10/2012 | Spiers et al. |
| 2013/0007434 | A1 | 1/2013 | King et al. |
| 2014/0047237 | A1 | 2/2014 | Parrish |
| 2014/0215215 | A1 | 7/2014 | Tanaka |
| 2014/0229731 | A1 | 8/2014 | O'Hare et al. |
| 2015/0052063 | A1 | 2/2015 | Feraud |
| 2015/0134960 | A1 | 5/2015 | Garcia Morchon et al. |
| 2017/0257352 | A1 | 9/2017 | Revell |
| 2017/0293768 | A1 | 10/2017 | Revell |
| 2017/0295016 | A1 | 10/2017 | Revell |
| 2017/0310665 | A1 | 10/2017 | Revell |
| 2018/0063131 | A1 | 3/2018 | Revell |

FOREIGN PATENT DOCUMENTS

| | | |
|---|---|---|
| WO | 83/04461 A1 | 12/1983 |
| WO | 02/05061 A2 | 1/2002 |
| WO | 02/39660 A2 | 5/2002 |
| WO | 03/009513 A2 | 1/2003 |
| WO | 2005/008950 A1 | 1/2005 |
| WO | 2009/060283 A1 | 5/2009 |
| WO | 2009/081418 A1 | 7/2009 |
| WO | 2011/002412 A1 | 1/2011 |
| WO | 2011/128183 A2 | 10/2011 |
| WO | 2013/079848 A1 | 6/2013 |
| WO | 2013/175324 A1 | 11/2013 |

OTHER PUBLICATIONS

Int'l Preliminary Report on Patentability issued in connection with Int'l Appl'n No. PCT/SE2015/050940 dated Jan. 17, 2017.
Int'l Search Report and Written Opinion for PCT/SE2015/051065, dated Dec. 17, 2015.
Int'l Search Report for PCT/SE2015/051066, dated Feb. 1, 2016.
Written Opinion for PCT/SE2015/051066, dated Sep. 28, 2016.
Anonymous, Mutual Authentication (The Java EE 6 Tutorial), 2010.
Search Report for European Pat. Appln. No. 15849042.5, dated Apr. 18, 2018.
Int'l Search Report and Written Opinion for PCT/SE2015/051067, dated Dec. 11, 2015.
Int'l Preliminary Report on Patentability for PCT/SE2015/051067, dated Jan. 11, 2017.
Oppliger, R. et al., "SSL/TLS Session-Aware User Authentication—or How to Effectively Thwart the Man-in-the-Middle", In Computer Communications, 29(12):2238-2246 (2006).
Int'l Search Report and Written Opinion for PCT/SE2015/051068, dated Jan. 29, 2016.
Byeong-Thaek Oh, et al., "A Peer Mutural Authentication Method using PKI on Super Peer based Peer-to-Peer Systems":2221-2225 (2008).
Int'l Search Report and Written Opinion for PCT/SE2015/051069, dated Dec. 1, 2015.
Aleksander et al.,"A Generation Method of Cryptographic Keys for Enterprise Communication Systems", 2013 International Conference on Availability, Reliability and Security:406-411 (2013).
Search Report for European Pat. Appln. No. 15849138.1, dated May 14, 2018.
Search Report for European Pat. Appln. No. 15849717.2, dated May 3, 2018.
Search Report for European Pat. Appln. No. 15848179.6, dated May 2, 2018.
Search Report for European Pat. Appln. No. 15849776.8, dated Apr. 25, 2018.
Search Report for European Pat. Appln. No. 15844748.2, dated Apr. 30, 2018.
Tim Dierks Independent Eric Rescorla Network Resonance et al., "The Transport Layer Security (TLS) Protocol Version 1.2; draft-ietf-tls-rfc4346-bis-10.txt", Internet Engineering Task Force, IETF; Standardworkingdraft, Internet Society (ISOC) 4, Rue Des Falaises CH-1205, Geneva, Switzerland, vol. tls, No. 10 (2008).
"Chapter 13: Key Management Techniques ED—Menezes A J; Van Oorschot P C; Vanstone S A", Handbook of Applied Cryptograph; [CRC Press Series on Discrete Mathematics and Its Applications], CRC Press, FL, US:543-590 (1996).
U.S. Appl. No. 15/516,932, filed Apr. 5, 2017, 2017-0257352, Improved Installation of a Terminal in a Secure System.
U.S. Appl. No. 15/516,939, filed Apr. 5, 2017, 2017-0295016, Generating a Symmetric Encryption Key.
U.S. Appl. No. 15/516,942, filed Apr. 5, 2017, 2018-0063131, Mutual Authentication.
U.S. Appl. No. 15/516,944, filed Apr. 5, 2017, 2017-0293768, Security Through Authentication Tokens.
U.S. Appl. No. 15/516,946, filed Apr. 5, 2017, 2017-0310665, Method and System for Establishing a Secure Communication Channel.

* cited by examiner

| A | B | C | D |
|---|---|---|---|
| 1 | 0 | 1 | 0 |

| D | C | A | A | C | B | D | B |
|---|---|---|---|---|---|---|---|
| 0 | 1 | 1 | 1 | 1 | 0 | 0 | 0 |

Node A

| A | C | A | B | D | B | D | C |
|---|---|---|---|---|---|---|---|
| 1 | 1 | 1 | 0 | 0 | 0 | 0 | 1 |

Virtual and temporary Node B

| | | | | | | | | |
|---|---|---|---|---|---|---|---|---|
| Value A | 0 | 1 | 1 | 1 | 1 | 0 | 0 | 0 |
| Value B | 1 | 1 | 1 | 0 | 0 | 0 | 0 | 1 |
| Match 1 | F | T | T | F | F | T | T | F |
| Value 1 | 0 | 1 | 1 | 0 | 0 | 1 | 1 | 0 |
| Key B | - | 1 | 1 | - | - | 0 | 0 | - |

| | | | | | | | | |
|---|---|---|---|---|---|---|---|---|
| Value A | 0 | 1 | 1 | 1 | 1 | 0 | 0 | 0 |
| Value 1 | 0 | 1 | 1 | 0 | 0 | 1 | 1 | 0 |
| Key A | - | 1 | 1 | - | - | 0 | 0 | - |

SECURE NODE-TO-MULTINODE COMMUNICATION

TECHNICAL FIELD

The present disclosure generally relates to communication sessions between a first node and a plurality of other nodes, i.e. two or more other nodes. In other words, the present disclosure relates to communication sessions in node-to-multinode scenarios.

BACKGROUND

The international patent application WO2011/002412A1 describes a method of generating a cryptographic key. More particularly, WO2011/002412A1 describes a method of generating a cryptographic key which is used for symmetric encryption, i.e. where the same cryptographic key is used for both encryption and decryption. While WO2011/002412A1 provides many advantages, the method described therein is limited to the generation of a cryptographic key for use in node-to-node communication sessions, i.e. communication sessions between a first node and a second node. That is, WO2011/002412A1 is focused on encrypted communication sessions in node-to-node scenarios between two nodes. WO2011/002412A1 is incorporated herein by reference for giving context to the present disclosure.

SUMMARY

The inventor has realized that there is need for secure communication sessions between a first node and several (i.e., two or more) other nodes. Or said differently, there is a need for broadcast-like communication sessions (i.e. between a first node and several other nodes) that offer the same, or substantially the same, degree of security as existing secure node-to-node communication systems.

Accordingly, it is a general object of the embodiments of the present invention to allow for communication sessions between a first node and several other nodes that offer the same, or substantially the same, degree of security as existing secure node-to-node communication systems. Advantageously, embodiments described herein should therefore allow for secure broadcast-like communication sessions (e.g., in node-to-multinode scenarios).

This general object has been addressed by the appended independent claims. Advantageous embodiments are defined in the appended dependent claims.

According to a first aspect, a method of establishing communication sessions between a first node and a plurality of other nodes is provided.

The first node sends a request message to a server for requesting the establishment of secure communication sessions with a plurality of other nodes. This request message includes a list of node identifiers wherein each of the node identifiers identifies a respective node of the plurality of other nodes.

The server receives said request message from the first node. In response to receiving the request message, the server creates a virtual and temporary second node, which is executable on the server. Furthermore, the server generates a list of temporary node identifiers on the basis of the list of node identifiers such that each of the plurality of nodes becomes identifiable by its respective temporary node identifier. Still further, the server communicates the list of temporary identifiers to the virtual and temporary second node.

Subsequently, the server sends a first key generating file to the first node. Also, the server communicates a second key generating file to the virtual and temporary second node.

The first node starts to process the first key generating file and the virtual and temporary second node starts to process the second key generating file. In response thereto, the first node generates a first intermediate data set and the virtual and temporary second node generates a second intermediate data set.

The first node sends the first intermediate data set to the virtual and temporary second node.

The virtual and temporary second node compares bits of the first intermediate data set with corresponding bits of the second intermediate data set. The virtual and temporary second node also generates a third intermediate data set based on the bit-by-bit comparison between the first intermediate data set and the second intermediate data set by setting a first value if the compared bits are equal and setting a second value if the compared bits are unequal.

Furthermore, the virtual and temporary second node sends the third intermediate data set to the first node.

The first node compares bits of the third intermediate data set with corresponding bits of the first intermediate data set.

Moreover, the first node generates, or otherwise creates, a first cryptographic key based on the bit-by-bit comparison between the third and the first intermediate data set by keeping the value of the bit of the first intermediate data set if the corresponding bit of the third intermediate data set is set to the first value and ignoring the bit of the first intermediate data set if the corresponding bit of the third intermediate data set is set to the second value.

Also, the virtual and temporary second node generates, or otherwise creates, a second cryptographic key based on the bit-by-bit comparison between the first and the second intermediate data set by keeping the value of the bit of the second data set if the corresponding bit of the first intermediate data set is equal and ignoring the bit of the second intermediate data set if the compared bits are unequal, said first and second cryptographic keys being the same.

The virtual and temporary second node sets up, or otherwise establishes, communication channels between the first node and each of the plurality of other nodes. The virtual and temporary second node uses, or utilizes, the list of temporary node identifiers for identifying the respective nodes of the plurality of nodes to which communication channels are to be set up, or established.

In response to the respective communication channels having been set up, the virtual and temporary second node also sends the second cryptographic key to each of the plurality of other nodes.

The first node applies the first cryptographic key and each of the plurality of other nodes applies the second cryptographic key during subsequent communication sessions between the first node and each of the plurality of other nodes.

According to a second aspect, a method performed by a first node for establishing communication sessions between the first node and a plurality of other nodes is provided. The method comprises the following steps, or actions:

sending a request message to a server for requesting the establishment of secure communication sessions with a plurality of other nodes, the request message including a list of node identifiers wherein each of the node identifiers identifies a respective node of the plurality of other nodes;
  receiving a first key generating file from the server;

starting to process the first key generating file; and in response
generating a first intermediate data set;
sending the first intermediate data set to a virtual and temporary second node, the virtual and temporary second node being executable on said server;
receiving a third intermediate data set from the virtual and temporary second node;
comparing bits of the third intermediate data set with corresponding bits of the first intermediate data set;
generating a first cryptographic key based on the bit-by-bit comparison between the third and the first intermediate data set by keeping the value of the bit of the first intermediate data set if the corresponding bit of the third intermediate data set is set to the first value and ignoring the bit of the first intermediate data set if the corresponding bit of the third intermediate data set is set to the second value; and
applying the first cryptographic key during the communication sessions between the first node and each of the plurality of other nodes.

According to a third aspect, a computer program is provided. The computer program comprises instructions which, when executed on at least one processor of the first node, cause the at least one processor to carry out the method according to the second aspect.

According to a fourth aspect, a carrier is provided. The carrier comprises the computer program according to the third aspect, and the carrier is one of: an electronic signal, an optical signal, a radio signal, or a computer readable storage medium.

According to a fifth aspect, a first node is provided. The first node is configured to perform, or otherwise execute, the method according to the second aspect.

According to a sixth aspect, a method performed by a server for establishing communication sessions between a first node and a plurality of other nodes is provided. The method comprises the following steps, or actions:
receiving a request message from the first node for requesting the establishment of secure communication sessions between the first node and a plurality of other nodes, the request message including a list of node identifiers wherein each of the node identifiers identifies a respective node of the plurality of other nodes;
in response to receiving said request message:
creating a virtual and temporary second node, which is executable within said server;
generating a list of temporary node identifiers on the basis of said list of node identifiers such that each of the plurality of nodes becomes identifiable by its respective temporary node identifier; and subsequently
sending a first key generating file to the first node and the server communicating a second key generating file to the virtual and temporary second node;
executing the virtual and temporary second node on the server and the virtual and temporary second node thereby:
starting to process the second key generating file; and in response
generating a second intermediate data set;
receiving a first intermediate data set from the first node;
comparing bits of the first intermediate data set with corresponding bits of the second intermediate data set;
generating a third intermediate data set based on the bit-by-bit comparison between the first intermediate data set and the second intermediate data set by setting a first value if the compared bits are equal and setting a second value if the compared bits are unequal;
sending the third intermediate data set to the first node;
generating a second cryptographic key based on the bit-by-bit comparison between the first and the second intermediate data set by keeping the value of the bit of the second data set if the corresponding bit of the first intermediate data set is equal and ignoring the bit of the second intermediate data set if the compared bits are unequal;
setting up communication channels between the first node and each of the plurality of other nodes, the virtual and temporary second node using the list of temporary node identifiers for identifying the respective nodes of the plurality of nodes to which communication channels are to be set up; in response to the respective communication channels having been set up
sending the second cryptographic key to each of the plurality of other nodes for subsequent application by each of the plurality of other nodes during the communication sessions between the first node and each of the plurality of other nodes.

According to a seventh aspect, a computer program is provided. The computer program comprises instructions which, when executed on at least one processor of the server, cause the at least one processor to carry out the method according to the sixth aspect.

According to an eight aspect, a carrier is provided. The carrier comprises the computer program according to the seventh aspect, and the carrier is one of: an electronic signal, an optical signal, a radio signal, or a computer readable storage medium.

According to a ninth aspect, a server is provided. The server is configured to perform, or otherwise execute, the method according to the sixth aspect.

According to a tenth aspect, a method performed by a node for establishing a communication session between said node and a first node is provided. The method comprises the following steps, or actions:
receiving a communication set-up request message from a virtual and temporary second node, which is executable on a server;
in response to receiving said communication set-up request message returning a response message for requesting a node identifier of the virtual and temporary second node;
receiving said node identifier of the virtual and temporary second node from the server,
comparing the received node identifier with stored node identifiers; in response thereto
sending a non-acknowledgement message to the server when the received node identifier does not match a stored node identifier; otherwise
authenticating the virtual and temporary second node when the received node identifier matches a stored node identifier and sending an acknowledgement message to the server; and in response
receiving a second cryptographic key from the virtual and temporary second node; and
applying the second cryptographic key during a communication session with the first node.

According to an eleventh aspect, a computer program is provided. The computer program comprises instructions which, when executed on at least one processor of the server, cause the at least one processor to carry out the method according to the tenth aspect.

According to a twelfth aspect, a carrier is provided. The carrier comprises the computer program according to the eleventh aspect, and the carrier is one of: an electronic signal, an optical signal, a radio signal, or a computer readable storage medium.

According to a thirteenth aspect, a node is provided. The node is configured to perform, or otherwise execute, the method according to the tenth aspect.

BRIEF DESCRIPTION OF DRAWINGS

These and other aspects, features and advantages will be apparent and elucidated from the following description of various embodiments, reference being made to the accompanying drawings, in which.

DETAILED DESCRIPTION

The present invention will now be described more fully hereinafter. The invention may, however, be embodied in many different forms and should not be construed as limited to the embodiments set forth herein; rather, these embodiments are provided by way of example so that this disclosure will be thorough and complete, and will fully convey the scope of the invention to those persons skilled in the art. Like reference numbers refer to like elements or method steps throughout the description.

As described above, there is a need for communication sessions between a first node and several (i.e. two or more) other nodes that offer the same, or substantially the same, degree of security as existing secure node-to-node communication systems. It is therefore a general object of embodiments described herein to provide relatively secure communication sessions between a first node and several other nodes, thereby allowing for relatively secure broadcast-like communication sessions.

Figure 1:
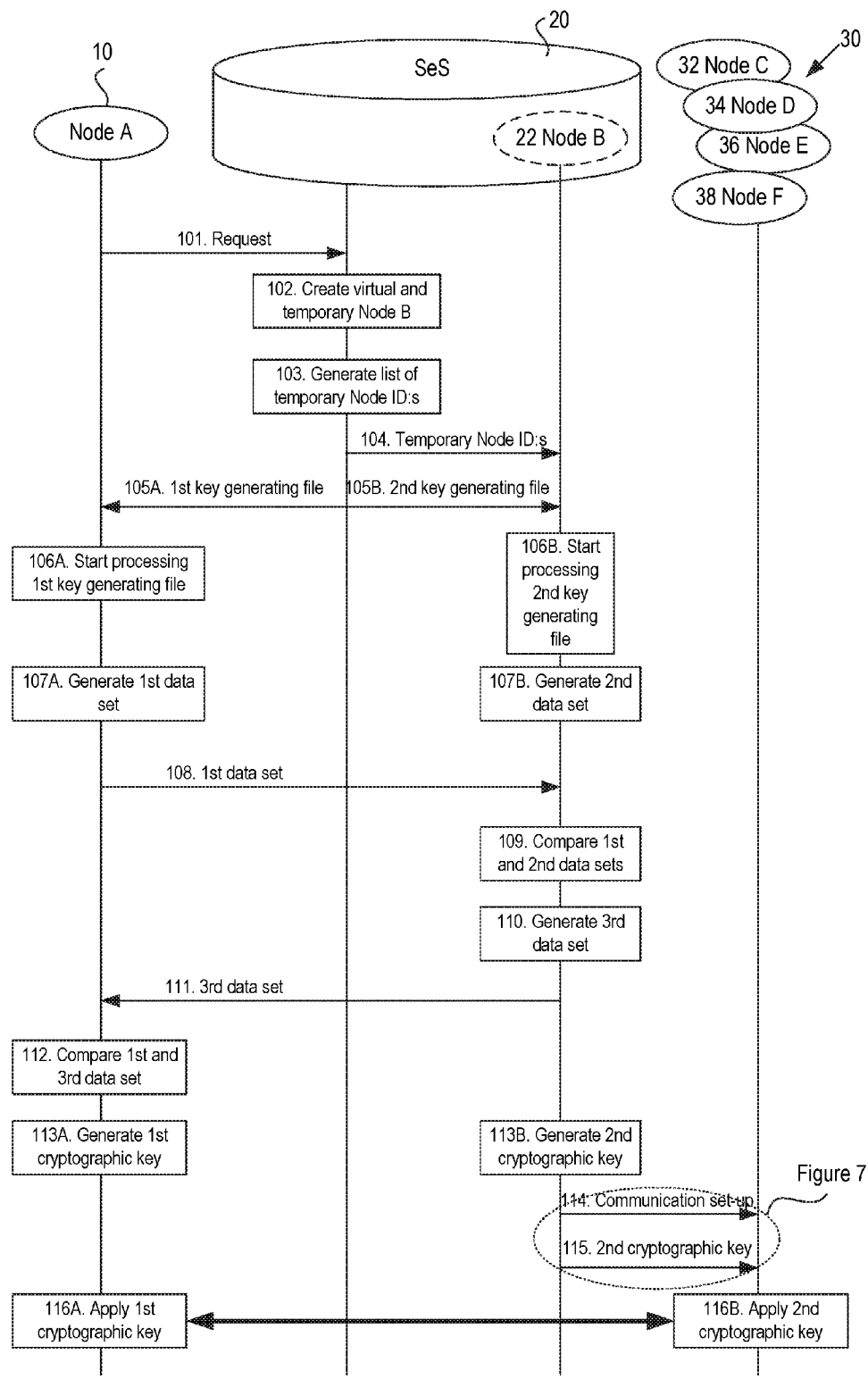
FIG. 1 schematically illustrates a system including a first node A, a server SeS and several other nodes C, D, E, F, etc. as well as example signaling between the first node A, the server SeS and the several other nodes C, D, E, F, etc.

FIG. 1 illustrates a system comprising a first node 10, hereinafter also referred to as Node A, and several other nodes 30, hereinafter also referred to as Nodes C 32, Node D 34, Node E 36, Node F 38, etc. The system also comprises a server 20. A node 10, 30 (e.g., Node A, B, C, D, E, F, etc.) may be any communication node. Consequently, the node 10, 30 may for example be an electronic device such as a computer, a laptop computer, a tablet computer, a cellular telephone, a mobile telephone or a smart phone. The server 20 may be any communication device (e.g. a computer server), which is capable of sending and/or receiving data messages in a secure way (e.g., by utilizing some kind of security certificate). Accordingly, the server 20 may sometimes be referred to as a secure server (abbreviated SeS).

With reference to FIG. 1, a method of communication between a first node 10 (i.e., Node A) and several other nodes 30 (i.e., Nodes C, D, E, F, . . . ) will be explained in greater detail. As will be appreciated, a method of generating cryptographic keys will also be explained with reference to FIG. 1. The method of generating cryptographic keys per se is similar to the method described in WO2011/002412A1. However, unlike the method described in WO2011/002412A1 the method of generating cryptographic keys according to this disclosure is executed by the first node 10 (i.e., Node A) and the server 20. The cryptographic key generated by the server 20 is then transmitted, or otherwise communicated, to the several other nodes 30 (i.e. Nodes C-F in this example) for subsequent application by these nodes 30. As will be appreciated, it is hereby made possible to allow for broadcast-like communication sessions (i.e. between the first node 10 and several other nodes 30) that may offer the same, or substantially the same, degree of security as existing secure node-to-node communication systems.

In order for the first node 10, i.e. Node A, to be able to use the secure communication with several other nodes (i.e. Nodes C-F) as described in this disclosure, the first node 10 may have to be authorized to communicate with the server 20. Thus, the server 20 may preferably, but not necessarily, keep track of all nodes (e.g. Nodes A, C, D, E, F, etc.) that are authorized to communicate with the server 20. As mentioned hereinabove, the communication between the server and the authorized nodes (e.g. the first node 10), or vice versa, is generally secure by using some kind of security certificate. For example, a X.509 certificate or the like may be used for secure communication.

With continued reference to FIG. 1, the first node sends 101, or transmits, a request message to the server 20 for requesting the establishment of secure communication sessions with a plurality of other nodes 30. The request message includes a list of node identifiers wherein each of the node identifiers identifies a respective node of the plurality of other nodes 30 with which the first node 10 wants to set-up secure communication sessions.

In response to receiving 101 the request message, the server 20 may also check if the first node 10 is authorized to communicate with the server 20. Optionally, the server 20 may also check if the first node 10 is authorized to set up secure communication with the plurality of other nodes 30 with which the first node 10 wants to set-up secure communication sessions.

In response to receiving 101 the request message, the server creates 102 a virtual and temporary second node 22 (hereinafter also referred to as Node B), which is executable within the server 20. In other words, in response to receiving 101 the request message, the server may be triggered to create, or otherwise generate, the virtual and temporary second node 22. More particularly, the server 20 may comprise at least one processor and at least one memory, wherein the at least one memory stores computer program with instructions which, when executed on said at least one processor, cause the server 20 to create, or otherwise generate, the virtual and temporary second node 22.

The virtual and temporary second node 22 is virtual in the sense that is it not a separate physical node such as the first node 10 (i.e., Node A) or the other nodes 30 (i.e., Nodes C-F). Rather, the virtual and temporary second node 22 is executed within the server 20 and embodies functionality of a second node with the same, substantially the same or similar functionality as a second node, i.e. Node B, as is described in WO2011/002412A1. It should be appreciated that, in some embodiments, the virtual and temporary second node 22 may be embodied as a computer program with instructions which, when executed on at least one processor of the server 20, causes the server 20 to apply the same, substantially the same or similar functionality of a second node as described in WO2011/002412A1.

The virtual and temporary second node 22 is temporary in the sense that the virtual and temporary second node 22 is only executable on the server 20 for a limited time period. For example, in some embodiments, the virtual and temporary second node 22 is only valid, and thus executable, until communication channels have been set-up between the first node 10 (i.e., Node A) and the plurality of other nodes 30 (i.e., Nodes C-F). For instance, as soon as the first node 10 (i.e., Node A) and the several other node(s) 30 (i.e., Nodes B, C, D, E, F) are in communication with each other, the virtual and temporary second node 22 may cease to be valid. Also, as soon as communication has begun between the first node 10 (i.e., Node A) and the several other node(s) 30 (i.e., Nodes B, C, D, E, F), these nodes may continue the communication session(s) directly with each other.

Furthermore, the server 20 generates 103 a list of temporary node identifiers on the basis of the earlier-mentioned list of node identifiers such that each of the plurality of nodes 30 becomes identifiable by its respective temporary node identifier. For example, the server 20 may generate 103 the list of temporary node identifiers in such way that each temporary node identifier is randomly generated from a respective node identifier from the received list of node identifiers. Various techniques for randomly generating the temporary node identifiers are conceivable. The temporary node identifiers are temporary in the sense that these temporary node identifiers are only used by the server 20 for a limited time period. For example, in some embodiments, the temporary node identifiers are only valid until communication channels have been set-up between the first node 10 (i.e., Node A) and the plurality of other nodes 30 (i.e., Nodes C-F). Generally, the generated list of temporary node identifiers is only known to the server 20 as it is the server 20 itself that generates 103 the list of temporary node identifiers (e.g., by means of random generation from the list of node identifiers received from the first node 10, i.e. Node A). This is advantageous, since this may improve the overall security.

Next, the server 20 also communicates 104 the list of temporary node identifiers to its created virtual and temporary second node 22.

Figures 2, 3, 4, 5, 6:
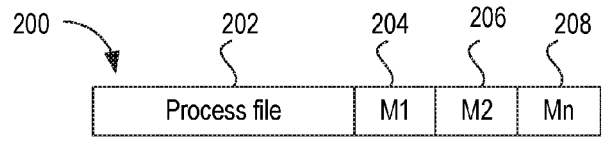
FIG. 2 is an example of a key generating file.
FIG. 3 is an example of a constant used for generating the first and second intermediate data sets.
FIG. 4 is an example of the first intermediate data set at the first node A and the second intermediate data set at a virtual and temporary second node B, which is executable at the server SeS shown in FIG. 1.
FIG. 5 illustrates an example of a matching process between the first and second data sets and the generation of a cryptographic key for the virtual and temporary second node B.
FIG. 6 is an example of the generation of a cryptographic key for the first node A.

Subsequently, the server 20 sends 105A a first key generating file to the first node. The server also communicates 105B a second key generating file to the virtual and temporary second node. FIG. 2 illustrates an example of a key generating file 200, in accordance with an embodiment. The key generating file 200 comprises a process file 202, which when executed will generate the encryption/decryption key, i.e. the cryptographic key. Since the processes at the first node 10 (i.e. Node A) and the virtual and temporary second node 22 (i.e. Node B) are different, which will be explained hereinbelow, the process file 202 sent to the first node 10 may differ from the process file 202 communicated to the virtual and temporary second node 22. As is depicted in FIG. 2, the key generating file 200 may additionally comprise metadata M1 (204), M2 (206), . . . , Mn (208). The metadata may comprise information used for generating the cryptographic key. The same metadata will typically be communicated to the first node 10 as well as the virtual and temporary second node 22. An example of metadata is a constant used, or otherwise utilized, to generate the cryptographic keys. FIG. 3 shows an example of such a constant used for generating a first intermediate data set and a second intermediate data set, respectively, which will be further explained hereinbelow. The metadata may also comprise a time stamp, or time tag, which may for example be used to check if both key generating files have the same origin. Furthermore, the metadata may comprise information about the key length to be used and/or which bits that should be used for generating the cryptographic key. Other information than that listed above may also be conceived in order to enhance security, as will be appreciated by those skilled in the art.

Upon receipt of the first key generating file, the first node 10 starts to process 106A the first key generating file. Similarly, upon receipt of the second key generating file, the virtual and temporary second node 22 starts to process 106B the second key generating file.

In response to the processing 106A of the first key generating file, the first node will generate 107A a first intermediate data set. For example, the first node 10 may generate 107A the first intermediate data set by using the value of the constant as depicted in FIG. 3. Also, in response to the processing 106B of the second key generating file, the virtual and temporary second node 22 will generate 107B a second intermediate data set. For example, the virtual and temporary second node 22 may generate 107B the second intermediate data set by using the value of the constant as depicted in FIG. 3. In the example above, the constant contains four binary bits each associated with a respective letter. The length of the constant may vary arbitrary and the bits may be associated with letters, figures, greek symbols, etc.

Examples of the first intermediate data set for the first node 10 (i.e. Node A) and the virtual and temporary second node 22 are shown in FIG. 4. The intermediate data sets may be generated by using any known pseudorandom number generator, e.g. using such pseudorandom algorithms as Blum Blum Shub, Fortuna or the Mersenne twister, for generating a random sequence of, in this example, the letters A, B, C and D. The random sequence of the letters is shown in the header of the first and second intermediate data sets, respectively, in FIG. 4. Thus, in order to generate the intermediate data set the sequence of the letters is first determined pseudo randomly and, subsequently, a correct value associated with the letter according to the constant of FIG. 3 is allotted. If this allotting results in generating, for example, only zeros (0) or only ones (1) for the intermediate data set this result may, in some embodiments, be filtered out and a new random sequence may be generated.

Since both the first and the second intermediate data sets are generated pseudo randomly, these two intermediate data sets will generally never be the same. The length of the intermediate data sets in this example is only eight bits in order to readily illustrate the embodiments of the present invention. In practice, however, the length of the intermediate data sets may typically be between 64 and 2048 bits. The bit length may be part of the metadata as mentioned above and may be set randomly by the server 20 each time a new request 101 is made from a node, such as the first node 10.

After the generation of the first and second intermediate date sets, the first node 10 sends 108 the first intermediate data set to the virtual and temporary second node 22.

The virtual and temporary second node 22 will then compare 109 bits of the first intermediate data set with corresponding bits of the second intermediate data set. Or said differently, the virtual and temporary second node 22 will compare the first and second intermediate data sets with each other. The result of the comparison 109 is called Match 1 in the table shown in FIG. 5.

As can be seen in FIG. 5, Value A and Value B correspond to the first and the second intermediate data sets, respectively. The comparison is a bit-by-bit comparison and the result is True if the value for first and second data set bit, respectively, is equal and False if they are unequal. The result, Match 1, of the comparison is used to create, or otherwise generate 110 a new third intermediate data set, Value 1, by setting a first value if the compared bits are equal and a second value if the compared bits are unequal. In this example, 1 is used when the compared bits are equal and 0 is used if the bits are unequal. However, it should be appreciated that it could also be the other way around.

Next, the virtual and temporary second node 22 sends 111 the generated third intermediate data set, Value 1, to the first node 10. For example, the third intermediate data set may be publicly sent, or transmitted, from the virtual and temporary second node 22 to the first node 10.

The first node 10 compares 112 bits of the third intermediate data set with corresponding bits of the first intermediate data set. Furthermore, the first node generates 113A a first cryptographic key based on the bit-by-bit comparison 112 between the third and the first intermediate data set by keeping the value of the bit of the first intermediate data set if the corresponding bit of the third intermediate data set is set to the first value and ignoring the bit of the first intermediate data set if the corresponding bit of the third intermediate data set is set to the second value. In this example, which is illustrated in FIG. 6, the first value corresponds to 1 and the second value corresponds to 0. As is evident from FIG. 6, the cryptographic key comprises four bits instead of the original eighth bits, since four bits have been ignored during the generation of the cryptographic key.

As mentioned earlier, both the first intermediate data set and the third intermediate data may be is sent publicly. Even if they were intercepted, there is in general no way for a third party to generate a cryptographic key using this data. This is because the value of a 1 in the third intermediate data set does not really mean the value 1, but instead that the first data set and the second data set have the same value. Thus, a 1 in the third intermediate data set may actually be either a 1 or a 0.

In the virtual and temporary second node 22, the second cryptographic key is generated based on a bit-by-bit comparison between the first and the second intermediate data set, see FIG. 5, by keeping the value of the bit of the second data set if the corresponding bit of the first intermediate data set is equal and ignoring the bit of the second intermediate data set if the compared bits are unequal. As can be seen in FIG. 5 and FIG. 6, the first and second cryptographic key, respectively, are the same cryptographic keys. The cryptographic keys may then be used for encryption/decryption of information sent between the first node A and the second node B. Any known encryption method may be used together with the cryptographic key generated by the method described herein.

Therefore, the present disclosure does not focus on how the encryption/decryption is made, but hitherto the focus has been towards the generation of cryptographic keys. After the generation of the cryptographic keys, the virtual and temporary second node sets up 114, or otherwise establishes, communication channels between the first node 10 and each of the plurality of other nodes 30. Typically, the virtual and temporary second node uses, or utilizes, the list of temporary node identifiers for identifying the respective nodes of the plurality of nodes to which communication channels are to be set up.

In response to the respective communication channels having been set up, the virtual and temporary second node 22 further sends 115 the second cryptographic key to each one of the plurality of other nodes 30.

Figure 7:
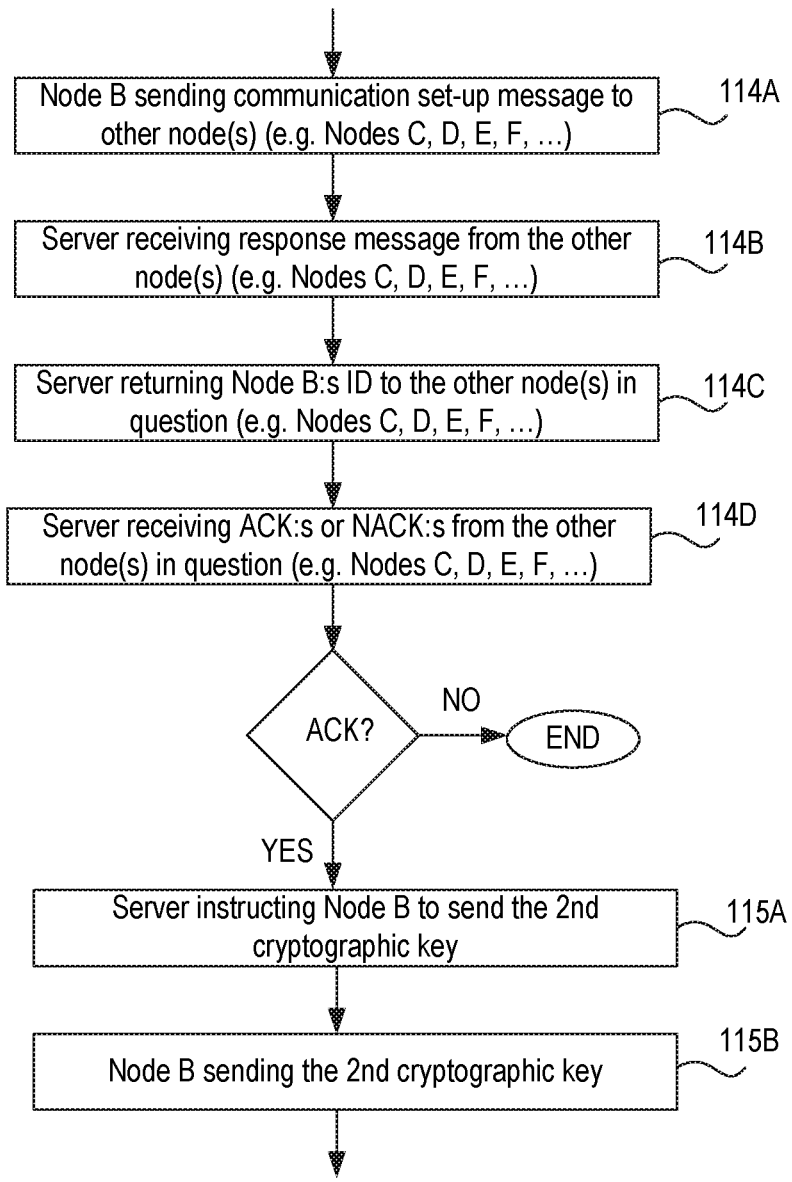
FIG. 7 is a flowchart showing a method according to an embodiment.

As will be appreciated, there exist various ways of setting up 114 the communication channels and sending 115 the second cryptographic key to each of the plurality of other nodes 30. In one example embodiment, which is schematically illustrated in FIG. 7, the virtual and temporary second node 22 may send 114A a communication set-up request message to each of the plurality of other nodes 30. In response thereto, the server 20 receives 114B a response message from each of the plurality of other nodes 30 for requesting a node identifier of the virtual and temporary second node. In response to receiving the response message(s), the server returns 114C a node identifier of the virtual and temporary second node 22 to those nodes 30 from which it received the response message. The server receives 114D either an acknowledgement (ACK) message or a non-acknowledgment (NACK) message from each of the plurality of other nodes 30. In response to receiving an acknowledgment (ACK) message, the server 20 instructs 115A the virtual and temporary second node 22 to send a second cryptographic key to each of the plurality of other nodes that returned an acknowledgement message. In response to receiving the instruction from the server 20, the virtual and temporary second node 22 sends the second cryptographic key to each of the plurality of other nodes that returned an acknowledgement message.

Persons skilled in the art will appreciate that the generated cryptographic keys, may be valid as long as the communication sessions between the first node 10 and a respective one of the other nodes 30 is/are active.

The above-mentioned embodiments are advantageous in that they enable secure node-to-multimode communication sessions between a first node 10 (e.g. Node A) and several other nodes 30 (e.g. Nodes C, D, E, F . . . ). Among other things, the node-to-multimode communication described herein does not reveal the node identifiers of the several other nodes 30. Instead, the server 20 and the virtual and temporary second node (e.g. Node B) use temporary node identifiers for these nodes that are 'targeted'. These temporary node identifiers are generated, e.g. randomly generated, by the server 20 and are hence only known to the server 20 and the virtual and temporary second node 22. This enhances security in node-to-multimode communication sessions, as it is very difficult (if at all possible) for other nodes to reveal all temporary node identifiers in a list of several temporary node identifiers.

Figure 8:
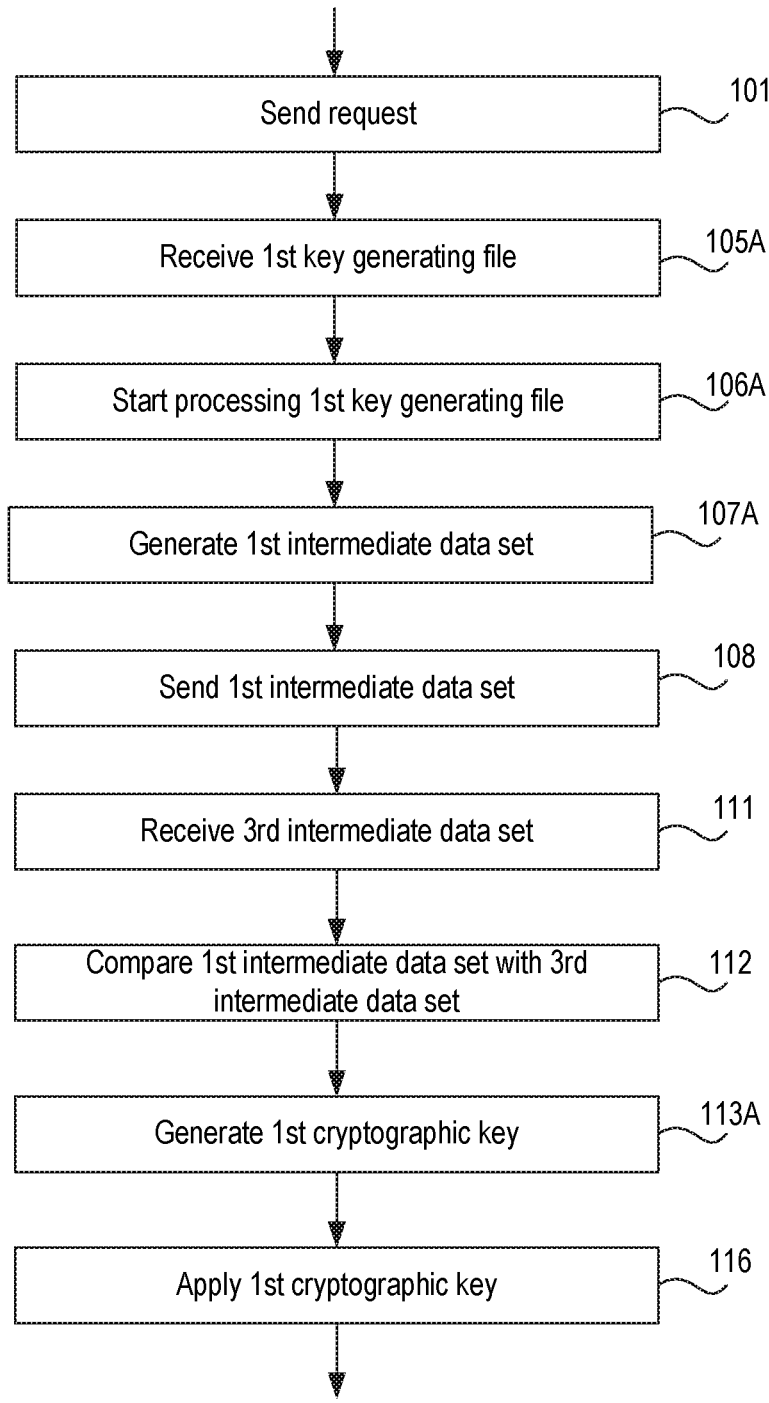
FIG. 8 is a flowchart showing a method performed by a first node (e.g., Node A in FIG. 1) in accordance with an embodiment.

Turning now to FIG. 8, a method in accordance with an embodiment will be described. The method is performed by, or otherwise executed in, a first node 10 (e.g. Node A). The first node 10 sends 101 a request message to a server 22 for requesting the establishment of secure communication sessions with a plurality of other nodes 30. The request message includes a list of node identifiers wherein each of the node identifiers identifies a respective node of the plurality of other nodes. The first node 10 also receives 105A a first key generating file from the server 20. Upon receiving 105A the first key generating file, the first node 10 starts to process 106A the first key generating file. When the first node 10 processes 106A the first key generating file, a first intermediate data set is generated 107A. The first intermediate data set is sent 108 to a virtual and temporary second node 22, which is executable on said server as described earlier. The first node 10 also receives 111 a third intermediate data set from the virtual and temporary second node. The first node 10 compares 112 bits of the third intermediate data set with corresponding bits of the first intermediate data set. Also, a first cryptographic key is generated 113A. The generation 113A of the first cryptographic key is based on the bit-by-bit comparison between the third and the first intermediate data set by keeping the value of the bit of the first intermediate data set if the corresponding bit of the third intermediate data set is set to the first value and ignoring the bit of the first intermediate data set if the corresponding bit of the third intermediate data set is set to the second value. Moreover, the first node 10 applies 116A the first cryptographic key during subsequent communication sessions between the first node 10 and each of the plurality of other nodes 30.

Figure 9:
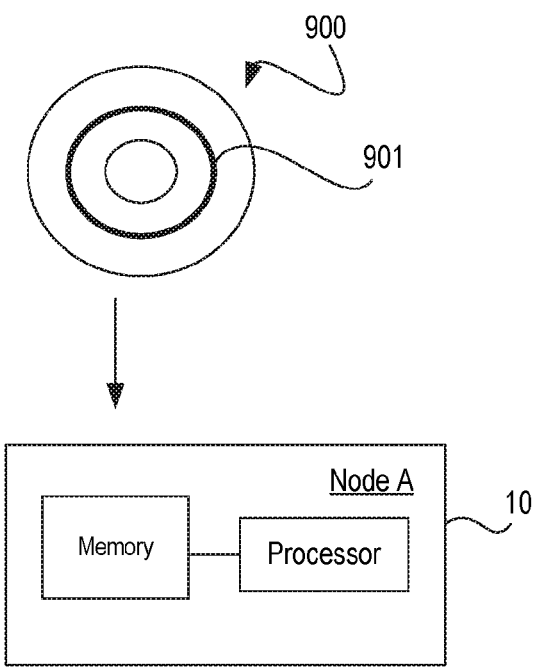
FIG. 9 illustrates an example of a computer-readable medium comprising computer program code means, which when executed in a processor of an apparatus, may cause said apparatus to execute the method shown in FIG. 8.

Turning now to FIG. 9, another embodiment will be briefly discussed. FIG. 9 shows an example of a computer-readable medium, in this example in the form of a data disc 900. In one embodiment, the data disc 900 is a magnetic data storage disc. The data disc 900 is configured to carry instructions 901 that when loaded into the at least one processor of the first node 10 (e.g. Node A), executes a method or procedure as described herein with respect to FIG. 1 or FIG. 8. The data disc 900 may be arranged to be connected to or within and read by a reading device (not shown), for loading the instructions into the at least one processor. One such example of a reading device in combination with one (or several) data disc(s) 900 is a hard drive. It should be noted that the computer-readable medium may alternatively be other mediums such as compact discs, digital video discs, flash memories or other memory technologies commonly used. In such embodiments, the data disc 900 is one type of a tangible computer-readable medium. The instructions may alternatively be downloaded to the first node 10 by comprising the instructions in a computer-readable signal (not shown) which is transmitted via a wireless (or wired) interface (for example via the Internet) to the first node 10 for loading the instructions into the at least one processor of the first node 10. In such an embodiment, the computer-readable signal is one type of a non-tangible computer-readable medium. The computer-readable signal may e.g. be an electronic signal, a optical signal, or a radio signal.

Figure 10:
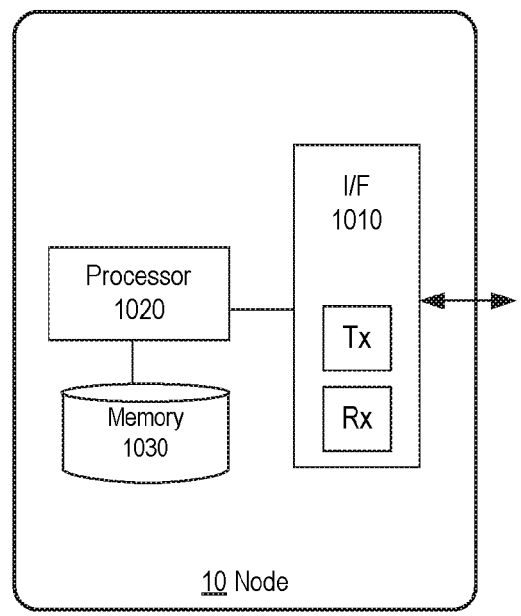
FIG. 10 illustrates an example implementation of a first node (e.g., Node A in FIG. 1)

FIG. 10 shows an example implementation of a first node 10 (e.g. Node A). The first node 10 comprises a communications interface 1010, which typically comprises a transmitter (Tx) and a receiver (Rx). Alternatively, the communications interface 1010 may comprise a transceiver which combines transmission and reception capabilities. Also, the first node comprises a processor 1020 and a memory 1030. The memory 1030 stores computer program with instructions which, when executed on the processor 1020, cause the first node 10 to:

(i) send, by means of the transmitter 1010, a request message to a server 20 for requesting the establishment of secure communication sessions with a plurality of other nodes 30 (see e.g. FIG. 1), the request message including a list of node identifiers wherein each of the node identifiers identifies a respective node of the plurality of other nodes 30;

(ii) receive, by means of the receiver 1010, a first key generating file from the server 20

(iii) process the first key generating file; and in response (iv) generate a first intermediate data set;

(v) send, by means of the transmitter 1010, the first intermediate data set to a virtual and temporary second node 22, the virtual and temporary second node 22 being executable on said server 20;

(vi) receive, by means of the receiver 1010, a third intermediate data set from the virtual and temporary second node 22;

(vii) compare bits of the third intermediate data set with the corresponding bits of the first intermediate data set;

(viii) generate a first cryptographic key based on the bit-by-bit comparison between the third and the first intermediate data set by keeping the value of the bit of the first intermediate data set if the corresponding bit of the third intermediate data set is set to the first value and ignoring the bit of the first intermediate data set if the corresponding bit of the third intermediate data set is set to the second value; and (ix) apply the first cryptographic key during subsequent communication session(s) between the first node 10 and one or more (e.g., each) of the plurality of other nodes 30.

Figure 11:
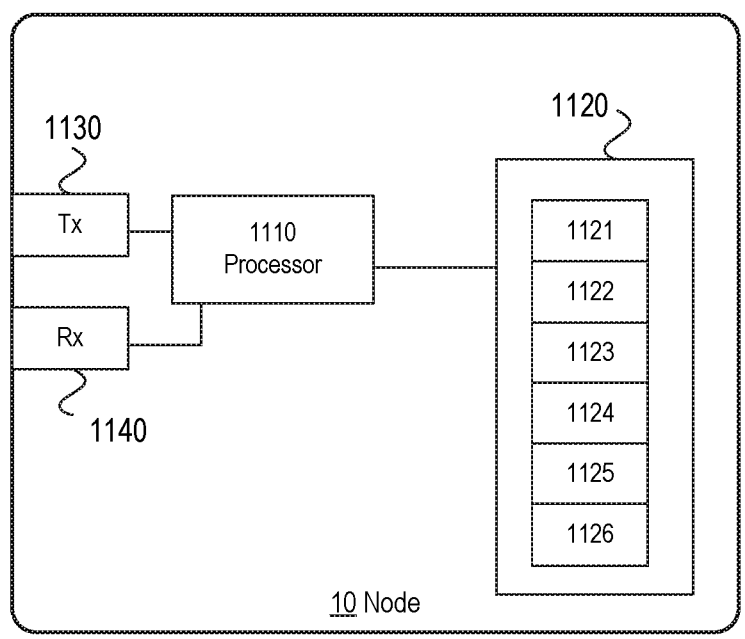
FIG. 11 illustrates another example implementation of a first node (e.g., Node A in FIG. 1)

With reference to FIG. 11, an alternative implementation of the first node 10 (e.g. Node A) will be described. The first node 10 may comprise a processor 1110, various modules 1120, a transmitter (Tx) 1130 and a receiver (Rx) 1140. The transmitter 1130 and the receiver 1140 may alternatively be implemented as a single transceiver. More particularly, the first node 10 comprises a sending module 1121 for sending, via the transmitter 1130, a request message to a server 20 for requesting the establishment of secure communication sessions with a plurality of other nodes 30 (see e.g. FIG. 1), the request message including a list of node identifiers wherein each of the node identifiers identifies a respective node of the plurality of other nodes 30. The receiver 1140 is configured to receive a first key generating file from the server 20. Also, a key generating file processing module 1122 is provided for processing the first key generating file. The first node 10 also comprises a data set generation module 1123 for generating a first intermediate data set. The transmitter 1010 is configured to send, or otherwise transmit, the first intermediate data set to a virtual and temporary second node 22, wherein the virtual and temporary second node 22 is executable on said server 20. The receiver 1140 is further configured to receive a third intermediate data set from the virtual and temporary second node 22. Moreover, the first node 10 comprises a bit comparator module 1124 for comparing bits of the third intermediate data set with the corresponding bits of the first intermediate data set. Still further, the first node comprises a cryptographic key generation module 1125 for generating a first cryptographic key based on the bit-by-bit comparison between the third and the first intermediate data set by keeping the value of the bit of the first intermediate data set if the corresponding bit of the third intermediate data set is set to the first value and ignoring the bit of the first intermediate data set if the corresponding bit of the third intermediate data set is set to the second value. Furthermore, the first node 10 may comprise a cryptographic key application module 1126 for applying the first cryptographic key during a subsequent communication session(s) between the first node 10 and one or more (e.g., each) of the plurality of other nodes 30.

Figure 12:
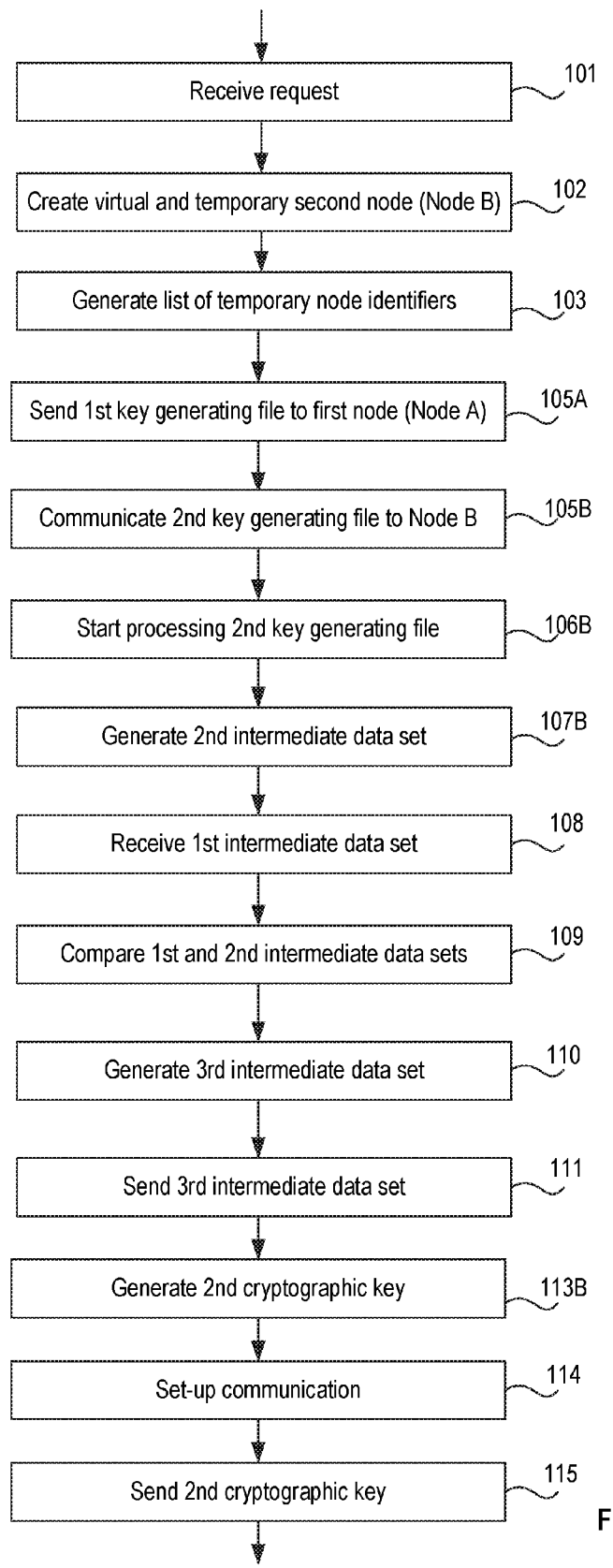
FIG. 12 is a flowchart showing a method performed by a server (e.g., SeS in FIG. 1) in accordance with an embodiment.

Turning now to FIG. 12, a method in accordance with an embodiment will be described. The method shown in FIG. 12 is performed by, or otherwise executed in, a server 20 (e.g., the SeS shown in FIG. 1). The server receives 101 a request message from the first node (e.g. Node A) for requesting the establishment of secure communication sessions between the first node 10 and a plurality of other nodes 30 (e.g., Nodes C, D, E, F,). This request message includes a list of node identifiers wherein each of the node identifiers identifies a respective node of the plurality of other nodes 30. In response to receiving the request message from the first node 10, the server creates, or otherwise generates, a virtual and temporary second node 22. As described earlier herein, the virtual and temporary second node 22 is executable within the server 20. Furthermore, the server generates 103, or otherwise establishes a list of temporary node identifiers on the basis of the list of node identifiers such that each of the plurality of nodes 30 becomes identifiable by its respective temporary node identifier. Subsequently, the server sends 105A a first key generating file to the first node 10. Also, the server 20 communicates 105B a second key generating file to the virtual and temporary second node 22. Still further, the virtual and temporary second node is executed on the server 20. This causes the server to start to process 106B the second key generating file. In response, a second intermediate data set is generated 107B. A first intermediate data set is received 108 from the first node. Furthermore, bits of the first intermediate data set are compared 109 with corresponding bits of the second intermediate data set. Subsequently, a third intermediate data set is generated 110 based on the bit-by-bit comparison between the first intermediate data set and the second intermediate data set by setting a first value if the compared bits are equal and setting a second value if the compared bits are unequal. The third intermediate data set is sent 111 to the first node. Also, a second cryptographic key is generated 113A based on the bit by bit comparison between the first and the second intermediate data set by keeping the value of the bit of the second data set if the corresponding bit of the first intermediate data set is equal and ignoring the bit of the second intermediate data set if the compared bits are unequal. Moreover, communication channels between the first node and each of the plurality of other nodes are set up 114, or otherwise established. The virtual and temporary second node 22 may use the list of temporary node identifiers for identifying the respective nodes of the plurality of nodes to which communication channels are to be set up. In response to the respective communication channels having been set up, the second cryptographic key is sent 115 to each of the plurality of other nodes 30 for subsequent application by one or more (e.g., each) of the plurality of other nodes 30 during the communication sessions between the first node 10 and the one or more (e.g., each) of the plurality of other nodes 30.

Figure 13:
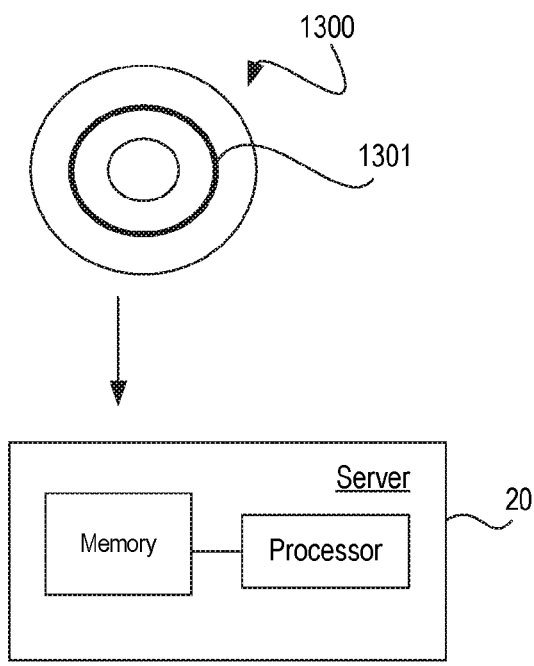
FIG. 13 illustrates an example of a computer-readable medium comprising computer program code means, which when executed in a processor of an apparatus, may cause said apparatus to execute the method shown in FIG. 12.

With reference to FIG. 13, another embodiment will be briefly discussed. FIG. 13 shows an example of a computer-readable medium, in this example in the form of a data disc 1300. In one embodiment, the data disc 1300 is a magnetic data storage disc. The data disc 1300 is configured to carry instructions 1301 that when loaded into the at least one processor of the server (e.g. SeS), executes a method or procedure as described herein with respect to FIG. 1 or 12. The data disc 1300 may be arranged to be connected to or within and read by a reading device (not shown), for loading the instructions into the at least one processor. One such example of a reading device in combination with one (or several) data disc(s) 1300 is a hard drive. It should be noted that the computer-readable medium may alternatively be other mediums such as compact discs, digital video discs, flash memories or other memory technologies commonly used. In such embodiments, the data disc 1300 is one type of a tangible computer-readable medium. The instructions may alternatively be downloaded to the server 20 by comprising the instructions in a computer-readable signal (not shown) which is transmitted via a wireless (or wired) interface (for example via the Internet) to the server 20 for loading the instructions into the at least one processor of the server 20. In such an embodiment, the computer-readable signal is one type of a non-tangible computer-readable medium. The computer-readable signal may e.g. be an electronic signal, a optical signal, or a radio signal.

Figure 14:
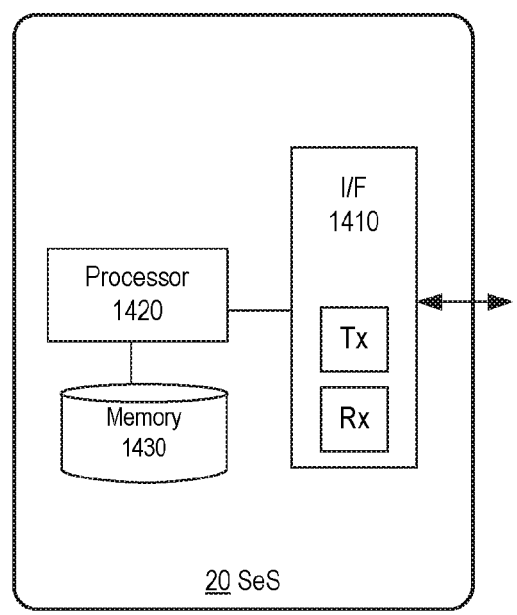
FIG. 14 illustrates an example implementation of a server (e.g., SeS in FIG. 1)

FIG. 14 shows an example implementation of a server 20 (e.g. SeS). The server 20 comprises a communications interface 1410, which typically comprises a transmitter (Tx) and a receiver (Rx). Alternatively, the communications interface 1410 may comprise a transceiver which combines transmission and reception capabilities. Also, the server 20 comprises a processor 1420 and a memory 1430. The memory 1430 stores computer program with instructions which, when executed on the processor 1420, causes the server 20 to:

(i) receive, by means of the receiver 1410, a request message from the first node 10 (e.g., Node A) for requesting the establishment of secure communication sessions between the first node 10 and a plurality of other nodes 30 (e.g, Nodes C, D, E, F, ... ), the request message including a list of node identifiers wherein each of the node identifiers identifies a respective node of the plurality of other nodes 30;

(ii) in response to receiving said request message create a virtual and temporary second node 22 (e.g. Node B), which is executable within said server 20; and (iii) generate a list of temporary node identifiers on the basis of said list of node identifiers such that each of the plurality of nodes becomes identifiable by its respective temporary node identifier; and subsequently (iv) send, by means of the transmitter 1410, a first key generating file to the first node 10; and (v) communicate a second key generating file to the virtual and temporary second node 22;

(vi) execute the virtual and temporary second node 22 on the server 20 and the virtual and temporary second node 22 thereby:
  a. process the second key generating file; and in response
  b. generate a second intermediate data set;
  c. receive, by means of the receiver 1410, a first intermediate data set from the first node 10;
  d. compare bits of the first intermediate data set with the corresponding bits of the second intermediate data set;
  e. generate a third intermediate data set based on the bit-by-bit comparison between the first intermediate data set and the second intermediate data set by setting a first value if the compared bits are equal and setting a second value if the compared bits are unequal;
  f. send, by means of the transmitter 1410, the third intermediate data set to the first node 10;
  g. generate a second cryptographic key based on the bit by bit comparison between the first and the second intermediate data set by keeping the value of the bit of the second data set if the corresponding bit of the first intermediate data set is equal and ignoring the bit of the second intermediate data set if the compared bits are unequal;

(vii) set up communication channels between the first node 10 and each of the plurality of other nodes 30, the virtual and temporary second node 22 using the list of temporary node identifiers for identifying the respective nodes of the plurality of nodes 30 to which communication channels are to be set up; in response to the respective communication channels having been set (viii) send, by means of the transmitter 1410, the second cryptographic key to each of the plurality of other nodes 30 for subsequent application by one or more (e.g., each) of the plurality of other nodes 30 during a subsequent communication session(s) between the first node 10 and the one or more (e.g., each) of the plurality of other nodes 30.

Figure 15:
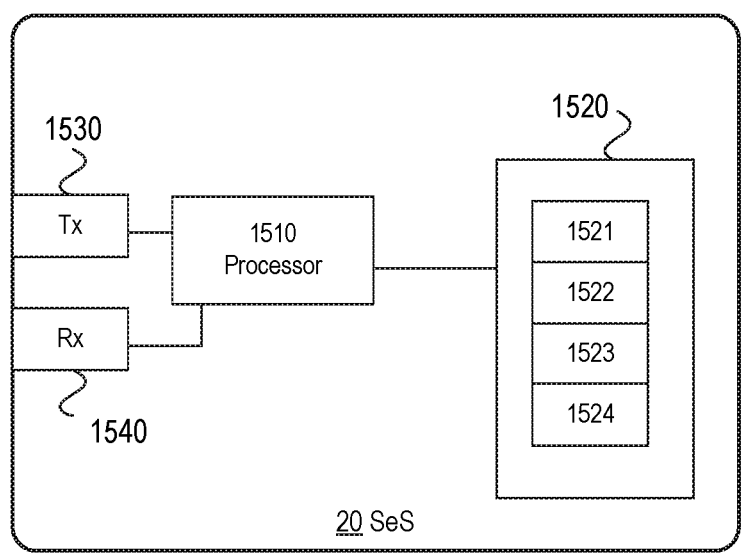
FIG. 15 illustrates another example implementation of a server (e.g., SeS in FIG. 1)

With reference to FIG. 15, an alternative implementation of the server 20 (e.g. SeS) will be described. The server 20 may comprise a processor 1510, various modules 1520, a transmitter (Tx) 1530 and a receiver (Rx) 1540. The transmitter 1530 and the receiver 1540 may alternatively be implemented as a single transceiver. More particularly, the receiver 1540 is configured to receive a request message from the first node 10 (e.g., Node A) for requesting the establishment of secure communication sessions between the first node 10 and a plurality of other nodes 30 (e.g, Nodes C, D, E, F, . . . ). The request message includes a list of node identifiers wherein each of the node identifiers identifies a respective node of the plurality of other nodes 30. A node creation module 1521 is also provided. In response to receiving said request message by means of the receiver 1540, the node creation module 1521 is adapted to create a virtual and temporary second node 22 (e.g. Node B), which is executable within said server 20. A TEMP Node ID generation module 1522 is provided for generating a list of temporary node identifiers on the basis of said list of node identifiers such that each of the plurality of nodes becomes identifiable by its respective temporary node identifier. Moreover, the transmitter 1530 is configured to send a first key generating file to the first node 10. Also, the server 20 communicates a second key generating file to the virtual and temporary second node 22, which is executable internally in said server 20. A virtual and temporary second node execution module 1523 is also provided for executing the virtual and temporary second node 22 on the server 20 and the virtual and temporary second node 22 thereby cause the server 20 to: i) process the second key generating file; and in response, ii) generate a second intermediate data set; iii) receive, by means of the receiver 1540, a first intermediate data set from the first node 10; iv) compare bits of the first intermediate data set with the corresponding bits of the second intermediate data set; v) generate a third intermediate data set based on the bit-by-bit comparison between the first intermediate data set and the second intermediate data set by setting a first value if the compared bits are equal and setting a second value if the compared bits are unequal; vi) send, by means of the transmitter 1530, the third intermediate data set to the first node 10; vii) generate a second cryptographic key based on the bit by bit comparison between the first and the second intermediate data set by keeping the value of the bit of the second data set if the corresponding bit of the first intermediate data set is equal and ignoring the bit of the second intermediate data set if the compared bits are unequal. A communication channel establishment module 1524 is adapted to set up communication channels (via the transmitter 1530 and the receiver 1540) between the first node 10 and one or several (e.g., each) of the plurality of other nodes 30, the virtual and temporary second node 22 using the list of temporary node identifiers for identifying the respective nodes of the plurality of nodes 30 to which communication channels are to be set up. In response to the respective communication channels having been set, the transmitter 1530 is configured to send the second cryptographic key to one or several (e.g., each) of the plurality of other nodes 30 for subsequent application by each of the plurality of other nodes 30 during the communication sessions between the first node 10 and each of the plurality of other nodes 30.

Figure 16:
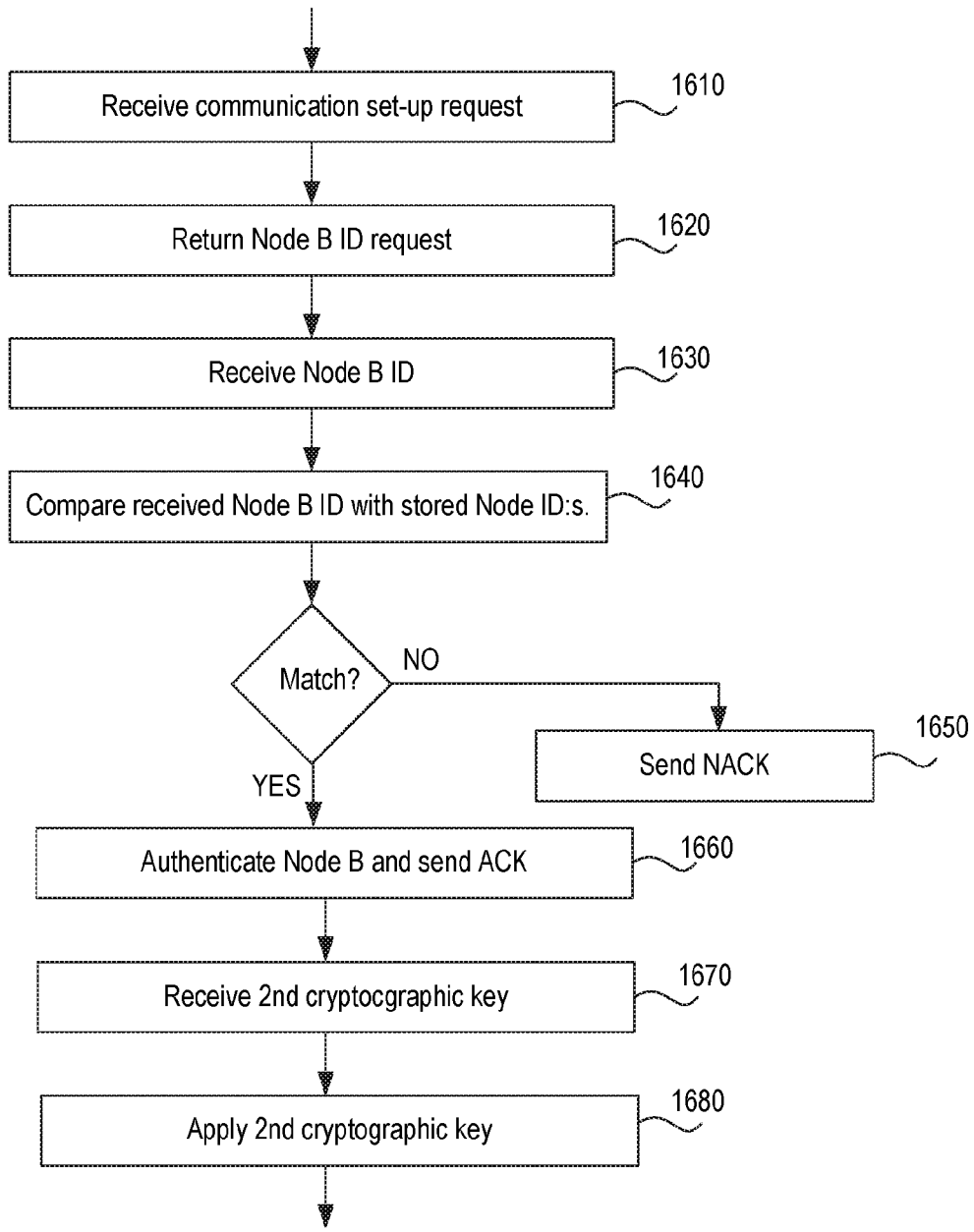
FIG. 16 is a flowchart showing a method performed by a node (e.g., Node C, D, E, and/or F in FIG. 1) in accordance with an embodiment.

FIG. 16 shows a flowchart of a method in accordance with an embodiment. The method illustrated in FIG. 16 is performed by, or otherwise executed in, a node 30 such as any one of the nodes 30 (e.g. Node C, D, E, F, . . . ). A communication set-up request message is received 1610 from a virtual and temporary second node, which is executable on a server 10 (e.g. SeS). From the perspective of the node 30, the request message appears to be received from the server 20. At this stage of the procedure, the node 30 generally does not know the identity of the virtual and temporary second node 22, which has been created by the server 20 for execution on the server 20. In response to receiving this communication set-up request message, a response message is returned 1620 for requesting a node identifier of the virtual and temporary second node 22. Next, the node 30 receives 1630 the node identifier of the virtual and temporary second node from the server. The node 30 compares 1640 the received node identifier with stored node identifiers. In response thereto, the node 30 sends 1650 a non-acknowledgement message to the server 20 when the received node identifier does not match a stored node identifier, otherwise the node 30 authenticates 1660 the virtual and temporary second node when the received node identifier matches a stored node identifier and sends an acknowledgement message to the server. Subsequently, the node 30 may receive 1670 a second cryptographic key from the virtual and temporary second node. Thereafter, the node 30 may apply 1680 the second cryptographic key during a communication session with the first node.

Figure 17:
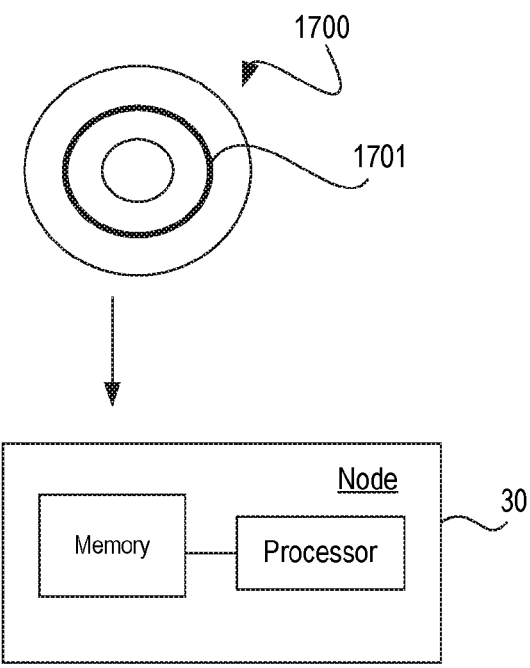
FIG. 17 illustrates an example of a computer-readable medium comprising computer program code means, which when executed in a processor of an apparatus, may cause said apparatus to execute the method shown in FIG. 16.

With reference to FIG. 17, another embodiment will be briefly discussed. FIG. 17 shows an example of a computer-readable medium, in this example in the form of a data disc 1700. In one embodiment, the data disc 1700 is a magnetic data storage disc. The data disc 1700 is configured to carry instructions 1701 that when loaded into the at least one processor of the node 30 (e.g. any on of Nodes C, D, E, F, . . . of FIG. 1)), executes a method or procedure as described herein with respect to FIG. 1 or 16. The data disc 1700 may be arranged to be connected to or within and read by a reading device (not shown), for loading the instructions into the at least one processor. One such example of a reading device in combination with one (or several) data disc(s) 1700 is a hard drive. It should be noted that the computer-readable medium may alternatively be other mediums such as compact discs, digital video discs, flash memories or other memory technologies commonly used. In such embodiments, the data disc 1700 is one type of a tangible computer-readable medium. The instructions may alternatively be downloaded to the node 30 by comprising the instructions in a computer-readable signal (not shown) which is transmitted via a wireless (or wired) interface (for example via the Internet) to the node 30 for loading the instructions into the at least one processor of the node 30. In such an embodiment, the computer-readable signal is one type of a non-tangible computer-readable medium. The computer-readable signal may e.g. be an electronic signal, an optical signal, or a radio signal.

Figure 18:
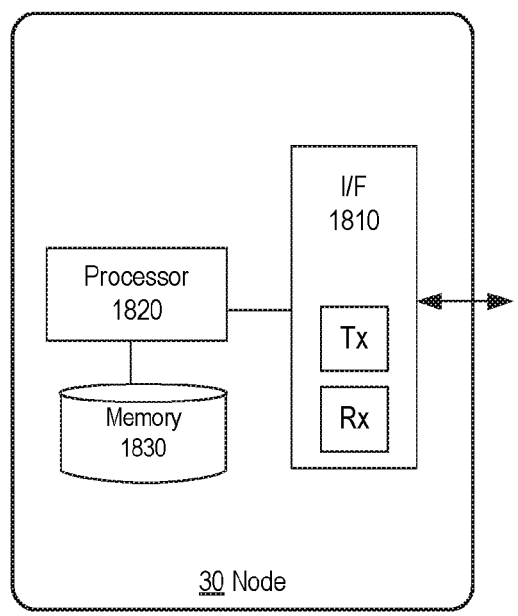
FIG. 18 illustrates an example implementation of a node (e.g., Node C, D, E, and/or F in FIG. 1)

FIG. 18 shows an example implementation of a node 30. The node 30 comprises a communications interface 1810, which typically comprises a transmitter (Tx) and a receiver (Rx). Alternatively, the communications interface 1810 may comprise a transceiver which combines transmission and reception capabilities. Also, the node 30 comprises a processor 1820 and a memory 1830. The memory 1830 stores computer program with instructions which, when executed on the processor 1820, causes the node 30 to:

i) receive, by means of the receiver, a communication set-up request message from a virtual and temporary second node 22, which is executable on a server 20;

ii) in response to receiving said communication set-up request message return, by means of the transmitter, a response message for requesting a node identifier of the virtual and temporary second node 22;

iii) receive, by means of the receiver, said node identifier of the virtual and temporary second node 22 from the server 20, iv) compare the received node identifier with stored node identifiers; in response thereto
 a. send, by means of the transmitter 1810, a non-acknowledgement message to the server 20 when the received node identifier does not match a stored node identifier; otherwise
 b. authenticate the virtual and temporary second node 22 when the received node identifier matches a stored node identifier;
 c. send, by means of the transmitter 1810, an acknowledgement message to the server 20; and in response
 d. receive, by means of the receiver 1810, a second cryptographic key from the virtual and temporary second node 22; and
 e. apply the second cryptographic key during a communication session with the first node 10.

Figure 19:
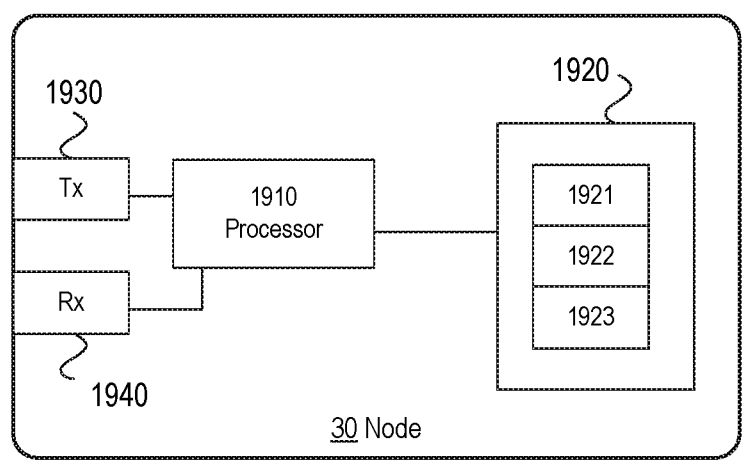
FIG. 19 illustrates another example implementation of a node (e.g., Node C, D, E, and/or F in FIG. 1).

With reference to FIG. 19, an alternative implementation of the node 30 will be described. The node 30 may comprise a processor 1910, various modules 1920, a transmitter (Tx) 1930 and a receiver (Rx) 1940. The transmitter 1930 and the receiver 1940 may alternatively be implemented as a single transceiver. More particularly, the receiver 1940 is configured to receive a communication set-up request message from a virtual and temporary second node 22, which is executable on a server 20. In response, the transmitter 1930 is configured to return, i.e. send, a response message for requesting a node identifier of the virtual and temporary second node. Furthermore, the receiver 1940 is configured to receive said node identifier of the virtual and temporary second node from the server 20. A node identifier comparator module 1921 is provided for comparing the received node identifier with stored node identifiers. Furthermore, a node authenticator module 1922 is provided for sending (via the transmitter 1930) a non-acknowledgement message to the server when the received node identifier does not match a stored node identifier, and otherwise authenticate the virtual and temporary second node when the received node identifier matches a stored node identifier and sending (via the transmitter 1930) an acknowledgement message to the server. The receiver 1940 is further configured to receive a second cryptographic key from the virtual and temporary second node. Moreover, a cryptographic key application module 1923 is provided for applying the second cryptographic key during a subsequent communication session with the first node 10.

It should be appreciated that a node may comprise functionality of both the first node 10 and the plurality of other nodes, i.e. denoted 30 in this disclosure.

The present disclosure has discussed various embodiments of communication between a first node and a plurality of other nodes, i.e. two or more other nodes. Turning back to FIG. 1, two cryptographic keys are generated. A first cryptographic key is generated 113A in a first node 10, e.g. Node A. A second cryptographic key is generated 113B by a second node 22, which is a virtual and temporary node being executed on a server 20, denoted SeS in FIG. 1. The second cryptographic key is transmitted to several other nodes 30, e.g. Nodes C, D, E and/or F. The first and second cryptographic keys, which are the same, may then be applied in communication sessions between the first node 10 and one or more of the several other nodes 30. Hereby it is made possible to allow for node-to-multinode communication sessions that offer the same, or substantially the same, security as conventional node-to-node communication sessions (e.g. as described in WO2011/002412A1).

In the detailed description hereinabove, for purposes of explanation and not limitation, specific details are set forth in order to provide a thorough understanding of various embodiments described in this disclosure. In some instances, detailed descriptions of well-known devices, components, circuits, and methods have been omitted so as not to obscure the description of the embodiments disclosed herein with unnecessary detail. All statements herein reciting principles, aspects, and embodiments disclosed herein, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure. Thus, for example, it will be appreciated that block diagrams herein can represent conceptual views of illustrative circuitry or other functional units embodying the principles of the described embodiments. Similarly, it will be appreciated that any flow charts and the like represent various processes which may be substantially represented in computer readable medium and so executed by a computer or processor, whether or not such computer or processor is explicitly shown. The functions of the various elements including functional blocks, may be provided through the use of hardware such as circuit hardware and/or hardware capable of executing software in the form of coded instructions stored on the above-mentioned computer readable medium. Thus, such functions and illustrated functional blocks are to be understood as being either hardware-implemented and/or computer-implemented, and thus machine-implemented. In terms of hardware implementation, the functional blocks may include or encompass, without limitation, digital signal processor (DSP) hardware, reduced instruction set processor, hardware (e.g., digital or analog) circuitry including but not limited to application specific integrated circuit(s) [ASIC], and/or field programmable gate array(s) (FPGA(s)), and (where appropriate) state machines capable of performing such functions. In terms of computer implementation, a computer is generally understood to comprise one or more processors or one or more controllers. When provided by a computer or processor or controller, the functions may be provided by a single dedicated computer or processor or controller, by a single shared computer or processor or controller, or by a plurality of individual computers or processors or controllers, some of which may be shared or distributed. Moreover, use of the term "processor" or "controller" may also be construed to refer to other hardware capable of performing such functions and/or executing software, such as the example hardware recited above.

Modifications and other variants of the described embodiments will come to mind to one skilled in the art having benefit of the teachings presented in the foregoing description and associated drawings. Therefore, it is to be understood that the embodiments are not limited to the specific example embodiments described in this disclosure and that modifications and other variants are intended to be included within the scope of this disclosure. For example, methods described herein are exemplified by method steps, or actions, that are performed or executed in a certain order. However, a person skilled in the art will appreciate that the method steps, or actions, that are described does not necessarily have be performed or executed in the exemplified order. Other orders may be equally possible or equally advantageous and so modifications and other variants of the described embodiments will come to mind to one skilled in the art. Furthermore, although specific terms may be employed herein, they are used in a generic and descriptive sense only and not for purposes of limitation. Therefore, a person skilled in the art would recognize numerous variations to the described embodiments that would still fall within the scope of the appended claims. As used herein, the terms "comprise/comprises" or "include/includes" do not exclude the presence of other elements or steps. Furthermore, although individual features may be included in different claims, these may possibly advantageously be combined, and the inclusion of different claims does not imply that a combination of features is not feasible and/or advantageous. In addition, singular references do not exclude a plurality.

The invention claimed is:

1. A method of establishing communication sessions between a first node and a plurality of other nodes, the method comprising:

the first node sending a request message to a server for requesting the establishment of secure communication sessions with a plurality of other nodes, the request message including a list of node identifiers wherein each of the node identifiers identifies a respective node of the plurality of other nodes;

the server receiving said request message from the first node; and in response to receiving said request message:
  the server creating a virtual and temporary second node, which is executable within said server;
  the server generating a list of temporary node identifiers on the basis of said list of node identifiers such that each of the plurality of nodes becomes identifiable by its respective temporary node identifier;
  the server communicating the list of temporary node identifiers to the virtual and temporary second node; and subsequently the server sending a first key generating file to the first node and the server communicating a second key generating file to the virtual and temporary second node;

the first node starting to process the first key generating file and the virtual and temporary second node starting to process the second key generating file; and in response the first node generating a first intermediate data set and the virtual and temporary second node generating a second intermediate data set;

the first node sending the first intermediate data set to the virtual and temporary second node;

the virtual and temporary second node comparing bits of the first intermediate data set with corresponding bits of the second intermediate data set;

the virtual and temporary second node generating a third intermediate data set based on the bit-by-bit comparison between the first intermediate data set and the second intermediate data set by setting a first value if the compared bits are equal and setting a second value if the compared bits are unequal;

the virtual and temporary second node sending the third intermediate data set to the first node;

the first node comparing bits of the third intermediate data set with corresponding bits of the first intermediate data set;

the first node generating a first cryptographic key based on the bit-by-bit comparison between the third and the first intermediate data set by keeping the value of the bit of the first intermediate data set if the corresponding bit of the third intermediate data set is set to the first value and ignoring the bit of the first intermediate data set if the corresponding bit of the third intermediate data set is set to the second value;

the virtual and temporary second node generating a second cryptographic key based on the bit by bit comparison between the first and the second intermediate data set by keeping the value of the bit of the second data set if the corresponding bit of the first intermediate data set is equal and ignoring the bit of the second intermediate data set if the compared bits are unequal, said first and second cryptographic keys being the same;

the virtual and temporary second node setting up communication channels between the first node and each of the plurality of other nodes, the virtual and temporary second node using the list of temporary node identifiers for identifying the respective nodes of the plurality of nodes to which communication channels are to be set up; and in response to the respective communication channels having been set up
the virtual and temporary second node further sending the second cryptographic key to each of the plurality of other nodes; and
the first node applying the first cryptographic key and each of the plurality of other nodes applying the second cryptographic key during the communication sessions between the first node and each of the plurality of other nodes.

2. The method according to claim 1, comprising:
the virtual and temporary second node sending a communication set-up request message to each of the plurality of other nodes; in response thereto
the server receiving a response message from each of the plurality of other nodes for requesting a node identifier of the virtual and temporary second node; and in response to receiving said response message
the server returning a node identifier of the virtual and temporary second node; and
the server receiving either an acknowledgement message or a non-acknowledgment message from each of the plurality of other nodes; and
in response to receiving an acknowledgment message, the server instructing the virtual and temporary second node to send a second cryptographic key to each of the plurality of other nodes that returned an acknowledgement message; and in response thereto
the virtual and temporary second node sending the second cryptographic key to each of the plurality of other nodes that returned an acknowledgement message.

3. A method performed by a first node for establishing communication sessions between the first node and a plurality of other nodes, the method comprising:
sending a request message to a server for requesting the establishment of secure communication sessions with a plurality of other nodes, the request message including a list of node identifiers wherein each of the node identifiers identifies a respective node of the plurality of other nodes;
receiving a first key generating file from the server;
starting to process the first key generating file; and in response
generating a first intermediate data set;
sending the first intermediate data set to a virtual and temporary second node, the virtual and temporary second node being executable on said server;
receiving a third intermediate data set from the virtual and temporary second node;
comparing bits of the third intermediate data set with corresponding bits of the first intermediate data set;
generating a first cryptographic key based on the bit-by-bit comparison between the third and the first intermediate data set by keeping the value of the bit of the first intermediate data set if the corresponding bit of the third intermediate data set is set to the first value and ignoring the bit of the first intermediate data set if the corresponding bit of the third intermediate data set is set to the second value; and
applying the first cryptographic key during the communication sessions between the first node and each of the plurality of other nodes.

4. The method according to claim 3, wherein a non-transitory computer readable medium comprises instructions which, when executed by at least one processor of the first node, cause the processor to carry out the method.

5. A first node for establishing communication sessions between the first node and a plurality of other nodes, the first node comprising:
a transmitter;
a receiver;
a processor; and
a memory storing computer program with instructions which, when executed on the processor, cause the first node to:
send, by means of the transmitter, a request message to a server for requesting the establishment of secure communication sessions with a plurality of other nodes, the request message including a list of node identifiers wherein each of the node identifiers identifies a respective node of the plurality of other nodes;
receive, by means of the receiver, a first key generating file from the server;
process the first key generating file; and in response
generate a first intermediate data set;
send, by means of the transmitter, the first intermediate data set to a virtual and temporary second node, the virtual and temporary second node being executable on said server;
receive, by means of the receiver, a third intermediate data set from the virtual and temporary second node;
compare bits of the third intermediate data set with the corresponding bits of the first intermediate data set;
generate a first cryptographic key based on the bit-by-bit comparison between the third and the first intermediate data set by keeping the value of the bit of the first intermediate data set if the corresponding bit of the third intermediate data set is set to the first value and ignoring the bit of the first intermediate data set if the corresponding bit of the third intermediate data set is set to the second value; and
apply the first cryptographic key during the communication sessions between the first node and each of the plurality of other nodes.

6. A method performed by a server for establishing communication sessions between a first node and a plurality of other nodes, the method comprising:
receiving a request message from the first node for requesting the establishment of secure communication sessions between the first node and a plurality of other nodes, the request message including a list of node identifiers wherein each of the node identifiers identifies a respective node of the plurality of other nodes;
in response to receiving said request message:
creating a virtual and temporary second node, which is executable within said server;
generating a list of temporary node identifiers on the basis of said list of node identifiers such that each of the plurality of nodes becomes identifiable by its respective temporary node identifier; and subsequently
sending a first key generating file to the first node and also communicating a second key generating file to the virtual and temporary second node;
executing the virtual and temporary second node on the server and the virtual and temporary second node thereby:
starting to process the second key generating file; and in response
generating a second intermediate data set;
receiving a first intermediate data set from the first node;

comparing bits of the first intermediate data set with corresponding bits of the second intermediate data set;

generating a third intermediate data set based on the bit-by-bit comparison between the first intermediate data set and the second intermediate data set by setting a first value if the compared bits are equal and setting a second value if the compared bits are unequal;

sending the third intermediate data set to the first node;

generating a second cryptographic key based on the bit by bit comparison between the first and the second intermediate data set by keeping the value of the bit of the second data set if the corresponding bit of the first intermediate data set is equal and ignoring the bit of the second intermediate data set if the compared bits are unequal;

setting up communication channels between the first node and each of the plurality of other nodes, the virtual and temporary second node using the list of temporary node identifiers for identifying the respective nodes of the plurality of nodes to which communication channels are to be set up; in response to the respective communication channels having been set up sending the second cryptographic key to each of the plurality of other nodes for subsequent application by each of the plurality of other nodes during the communication sessions between the first node and each of the plurality of other nodes.

7. The method according to claim 6, wherein a non-transitory computer readable medium comprises instructions which, when executed by at least one processor of the server, cause the processor to carry out the method.

8. A server for establishing communication sessions between a first node and a plurality of other nodes, the server comprising:
 a transmitter;
 a receiver;
 a processor; and
 a memory storing computer program with instructions which, when executed on the processor, cause the server to:
 receive, by means of the receiver, a request message from the first node for requesting the establishment of secure communication sessions between the first node and a plurality of other nodes, the request message including a list of node identifiers wherein each of the node identifiers identifies a respective node of the plurality of other nodes;
 in response to receiving said request message create a virtual and temporary second node, which is executable within said server;
 generate a list of temporary node identifiers on the basis of said list of node identifiers such that each of the plurality of nodes becomes identifiable by its respective temporary node identifier; and subsequently
 send, by means of the transmitter, a first key generating file to the first node; and
 communicate a second key generating file to the virtual and temporary second node;
 execute the virtual and temporary second node on the server and the virtual and temporary second node thereby:
 process the second key generating file; and in response generate a second intermediate data set;
 receive, by means of the receiver, a first intermediate data set from the first node;
 compare bits of the first intermediate data set with the corresponding bits of the second intermediate data set;
 generate a third intermediate data set based on the bit-by-bit comparison between the first intermediate data set and the second intermediate data set by setting a first value if the compared bits are equal and setting a second value if the compared bits are unequal;
 send, by means of the transmitter, the third intermediate data set to the first node;
 generate a second cryptographic key based on the bit by bit comparison between the first and the second intermediate data set by keeping the value of the bit of the second data set if the corresponding bit of the first intermediate data set is equal and ignoring the bit of the second intermediate data set if the compared bits are unequal;
 set up communication channels between the first node and each of the plurality of other nodes, the virtual and temporary second node using the list of temporary node identifiers for identifying the respective nodes of the plurality of nodes to which communication channels are to be set up; in response to the respective communication channels having been set up
 send, by means of the transmitter, the second cryptographic key to each of the plurality of other nodes for subsequent application by each of the plurality of other nodes during the communication sessions between the first node and each of the plurality of other nodes.

9. A method performed by a node for establishing a communication session between said node and a first node, the method comprising:
 receiving a communication set-up request message from a virtual and temporary second node, which is executable on a server;
 in response to receiving said communication set-up request message returning a response message for requesting a node identifier of the virtual and temporary second node;
 receiving said node identifier of the virtual and temporary second node from the server,
 comparing the received node identifier with stored node identifiers; in response thereto
 sending a non-acknowledgement message to the server when the received node identifier does not match a stored node identifier; otherwise
 authenticating the virtual and temporary second node when the received node identifier matches a stored node identifier and sending an acknowledgement message to the server; and in response
 receiving a second cryptographic key from the virtual and temporary second node; and
 applying the second cryptographic key during a communication session with the first node.

10. The method according to claim 9, wherein a non-transitory computer readable medium comprises instructions which, when executed by at least one processor of the first node, cause the processor to carry out the method.

11. A node for establishing a communication session between said node and a first node; the node comprising:
 a transmitter;
 a receiver;
 a processor; and
 a memory storing computer program with instructions which, when executed on the processor, cause the node to:

receive, by means of the receiver, a communication set-up request message from a virtual and temporary second node, which is executable on a server;

in response to receiving said communication set-up request message return, by means of the transmitter, a response message for requesting a node identifier of the virtual and temporary second node;

receive, by means of the receiver, said node identifier of the virtual and temporary second node from the server, compare the received node identifier with stored node identifiers; in response thereto send, by means of the transmitter, a non-acknowledgement message to the server when the received node identifier does not match a stored node identifier; otherwise authenticate the virtual and temporary second node when the received node identifier matches a stored node identifier;

send, by means of the transmitter, an acknowledgement message to the server; and in response receive, by means of the receiver, a second cryptographic key from the virtual and temporary second node; and apply the second cryptographic key during a communication session with the first node.

\* \* \* \* \*